United States Patent [19]

Santala

[11] 4,071,659

[45] Jan. 31, 1978

[54] SOLAR ABSORPTION SURFACE PANEL

[75] Inventor: Teuvo J. Santala, Attleboro, Mass.

[73] Assignee: Texas Instruments Incorporated, Dallas, Tex.

[21] Appl. No.: 631,792

[22] Filed: Nov. 13, 1975

[51] Int. Cl.² .................. F24J 3/02; B32B 15/18; B32B 15/20

[52] U.S. Cl. .................. 428/677; 126/270; 428/680; 428/941

[58] Field of Search .......... 29/196.6, 196.2, 196.3; 126/270, 271; 428/680, 652, 677, 674, 941

[56] References Cited

U.S. PATENT DOCUMENTS

| 3,597,172 | 8/1971 | Bungardt et al. | 29/196.2 |
| 3,647,517 | 3/1972 | Milidanti et al. | 29/196.6 |
| 3,762,884 | 10/1973 | Grisaffe et al. | 29/196.2 |
| 3,898,052 | 8/1975 | Dean et al. | 29/196.2 |
| 3,898,979 | 8/1975 | Medico | 126/271 |
| 3,920,413 | 11/1975 | Lowery | 126/270 |

*Primary Examiner*—Arthur J. Steiner
*Attorney, Agent, or Firm*—John A. Haug; James P. McAndrews

[57] ABSTRACT

A composite metal of aluminum and nickel is used to form an economical solar absorption surface for a collector plate wherein an intermetallic compound of the aluminum and nickel provides a surface morphology with high absorptance and relatively low infrared emittance along with good durability.

4 Claims, No Drawings

SOLAR ABSORPTION SURFACE PANEL

BACKGROUND AND SUMMARY OF INVENTION

This invention relates to an improved solar absorption surface collector plate and more particularly to an improved solar absorption surface for a collector plate or panel made of a composite metal wherein an intermetallic compound is formed of this composite material.

The three basic requirements for an ideal solar absorption surface for a thermal collector plate are high collection efficiency, good durability especially at elevated temperatures, and low cost. The key elements of high collection efficiency are high solar absorptance, low infrared emittance and low conduction and convection losses. Without minimizing the importance of conduction and convection losses, they are not a prime consideration in solar absorption surface choice. Their importance is in the design of the solar collector in which that surface is used. High solar absorption, on the other hand, is the prime prerequisite for any solar surface. Next in importance is a solar absorption surface with low infrared emittance.

The use of a selective surface (i.e. a surface with high solar absorptance and low infrared emittance) has been shown to be a good approach in general to produce a high solar absorptance surface. An example of such a selective surface is black copper. However, problems have arisen with most systems using the selective surrface approach in one or more of the following areas: durability at high temperatures, economy of production or preferential absorption due to directionality of the surface. The use of a composite metal aluminum iron system in which an intermetallic compound is formed overcomes the above problems but is not totally acceptable because the infrared emittance value is higher than desired. For example, the value of infrared emittance for an aluminum iron intermetallic compound surface is typically above 0.65 as compared with a generally considered desirable value of under 0.35.

It is an object of this invention to provide an improved selective solar absorption surface. It is another object to provide a selective solar absorption surface which has high collector efficiency, low cost, low infrared emmittance and good durability. It is yet another object of this invention to provide a selective sola absorption surface which is part of a low cost collector plate. Other objects and features will be in part apparent and in part pointed out hereinafter.

Briefly, the present invention comprises a selective solar absorption surface employing an intermetallic compound wherein aluminum is reacted at an elevated temperature with nickel. The aluminum and nickel materials are bonded to form a composite material preferably by using conventional roll-bonding techniques and subsequently rolled down to a desirable finish gauge. The composite is then heated to a temperature of between 1000° F. and 1550° F. to form a uniform intermetallic compound surface, the surface morphology providing for high collection efficiency along with low infrared emittance. The durability is excellent at elevated temperatures because the intermetallic is essentially stable under about 1000° F.

The present invention is directed to an improved solar absorption surface. Preferably a commercially pure aluminum metal or an aluminum silicon alloy with 98.5 weight percent aluminum and 1.5 weight percent silicon and commercially pure or high purity nickel metals are used as component materials. Hereafter they will be referred to as aluminum and nickel.

The aluminum and nickel materials are cleaned by conventional means and preferably bonded for economical reasons by using conventional roll-bonding techniques although other techniques to form a laminate such as physical vapor deposition of aluminum or electroplating of the nickel followed by physical vapor deposition would be perfectly acceptable. The bonded material is typically subsequently rolled as part of a collector plate (to be discussed more fully below) to a desired overall thickness. Preferably the overall thickness of the aluminum at final gauge is between 0.0004 and 0.0012 of an inch. Since the Al Ni family of intermetallic compounds are formed during compounding by stoichiometric computation the nickel thickness can be computed. The nickel should be at least 66 percent as thick as the aluminum, however, preferably the nickel will be as thick or thicker than the aluminum.

The composite is then subjected to a heat treating step. The material is heated in the range of 1000° F. to 1550° F. from 5 minutes to over an hour to form an intermetallic compound of aluminum and nickel. Preferably air, exothermic base gas, and dissociated ammonia are used as furnace atmospheres. Since the melting point of aluminum is approximately 1200° F., the compounding temperature range covers cases wherein the aluminum would melt. However, little or no run-off of the aluminum is encountered because of the partial formation of the compound during heat-up, the surface tension of the aluminum and the oxide skin layer on top of the aluminum. It should be noted to achieve desired results it is important to provide for complete compounding of the aluminum.

An example of the formation of a desirable selective solar absorption surface was obtained from a composite of aluminum and nickel of 0.020 of an inch with the aluminum being 0.0008 of an inch and the nickel the balance. The composite was heated for 60 minutes at 1350° F. in an exothermic base gas. The solar absorption as measured in a solar simulator using a calometric technique was greater than 0.95 and the infrared emittance in the 3–30μ wave length region as measured with Lion Research Corporation Model 25B Emissometer was less than 0.30. A value of over 0.90 is a high solar absorption value and a ratio of over 3 for solar absorption divided by infrared emittance is desirable.

Intermetallic compounds such as formed of aluminum and iron, aluminum and chromium, and aluminum and nickel demonstrate high solar absorptance. The reason for this high absorptance property is due to the surface morphology. As viewed in a scanning electron microscope the surface has a highly porous structure and it is believed that the porous surface provides interference wave length matching and multiple scattering giving rise to high solar absorptance. However, the porous structure of the intermetallic compound of aluminum and nickel is different from other evaluated intermetallic compounds in that the aluminum and nickel compound has a sponge-like structure whereas the others have a dentritic crystalline structure. It is believed this structure difference provides the desired lower infrared emittance value.

The durability of the aluminum nickel appears to be excellent even at elevated temperatures. The formed intermetallic compound is stable up to temperatures well in excess of 1000° F. Humidity tests performed on the surface do not show adverse effects even in an accelerated mode of cycling humidity between 20 percent and 100 percent every eight hours.

The selective solar absorption surface of aluminum and nickel is easily and economically used as part of a solar collector plate. The desired materials for the collector plate core may be copper or some composite such as one comprising copper and low carbon steel layers to which the aluminum and nickel can be metallurgically bonded and then compounded in situ. This process allows for reliable, economical construction especially when a forming operation on the solar collector plate is to be performed because the compounding step can be done after the forming.

In view of the above, it will be seen that the several objects of the invention are achieved and other advantageous results attained.

As various changes could be made in the above theories without departing from the scope of the invention, it is intended that all matter contained in the abovedescription shall be interpreted as illustrative and not in a limiting sense.

I claim:

1. In a solar collector plate having a core and an absorption surface thereon, the improvement comprising said surface being made from an intermetallic compound of aluminum and nickel and formed by joining layer of aluminum and a layer of nickel which is at least 66 percent as thick as said aluminum layer and heating said joined layers to a temperature between 1000° F and 1550° for a period of 5 minutes to one hour, said intermetallic compound having a sponge like surface morphology which results in high absorptance and low infrared emittance values.

2. The solar collector plate of claim 1 in which said core comprises a layer of copper.

3. The solar collector plate of claim 2 in which said core comprises a composite of copper and low carbon steel layers.

4. The solar collector plate of claim 1 in which said aluminum layer is between 0.0004 and 0.0012 of an inch thick.

* * * * *